United States Patent [19]

Royet

[11] 4,314,624
[45] Feb. 9, 1982

[54] WHEEL-MOUNTED LUGGAGE

[76] Inventor: Paul F. Royet, Z.I. Nord, Avenue de la Roseraie, Pierrelatte (Drôme), France

[21] Appl. No.: 193,010

[22] Filed: Oct. 2, 1980

[30] Foreign Application Priority Data

Oct. 3, 1979 [FR] France .................. 79 25151

[51] Int. Cl.³ ............................................ A45C 5/14
[52] U.S. Cl. .................................. 190/18 A; 280/37; 280/646
[58] Field of Search ............ 190/18 A; 280/37, 47.26, 280/646

[56] References Cited

U.S. PATENT DOCUMENTS 3,842,953 10/1974 Royet .................. 190/18 A
4,087,102 5/1978 Sprague .............. 190/18 A X

FOREIGN PATENT DOCUMENTS 411700 4/1925 Fed. Rep. of Germany .
424204 2/1935 United Kingdom .
1099200 1/1968 United Kingdom .

Primary Examiner—Donald F. Norton
Attorney, Agent, or Firm—Karl F. Ross

[57] ABSTRACT

A piece of luggage has a case with a substantially flat bottom wall formed with a pair of generally parallel grooves, with a pair of longitudinally spaced relatively wide outwardly open recesses in each groove, and with a wheel cutout adjacent a lower end of each groove. Respective solid support blocks are force-fitted in the recesses and are each formed with a throughgoing passage aligned with the respective groove. Respective tubes extend longitudinally along the grooves through the respective passages in the blocks and are rotatable in these blocks. Pivot mounts for wheels are carried on the lower tube ends and a handle is connected to the upper tube ends and are displaceable longitudinally relative thereto. Structure in the tube between the handle and the pivot mounts pivots these mounts through about 90° between positions with the wheels in the cutouts and the wheels standing up from the bottom wall on displacement of the handle longitudinally away from the upper tube ends.

7 Claims, 3 Drawing Figures

WHEEL-MOUNTED LUGGAGE

FIELD OF THE INVENTION

The present invention relates to a piece of luggage of the type carrying wheels intended to ease transport of the luggage.

BACKGROUND OF THE INVENTION

Wheel-mounted luggage has become increasingly popular in these days when a person must normally carry and look after his or her own luggage. Such luggage can be seen in my earlier U.S. Pat No. 3,842,953 as well as in British Pat. Nos. 1,099,200 and 424,204 and in German Pat. No. 411,700. It is standard procedure to provide the wheels on such luggage, which may be a simple suitcase, steamer trunk, sample case, officer's chest, or the like, so that these wheels can be displaced between use positions standing up from the surface they are carried on and transport positions in which they lie on or are even recessed in this surface. Thus a person can, for instance, take his or her luggage off the carousel at an airline and actuate the mechanism to make the wheels stand up so that the luggage can then be easily rolled away. In my above-cited patent, for example, the entire wheel mechanism is mounted on one face of the suitcase and a handle is pulled from adjacent one end of the suitcase to cause wheels adjacent the other end of the suitcase to pivot through 90° from positions recessed in the suitcase to positions standing up from it.

The known systems have several disadvantages. First of all the wheel mechanisms are relatively complex and, hence, heavy. As a result they add excessive weight to the piece of luggage, which weight is particularly disadvantageous when the luggage is not being rolled. Furthermore the complicated mounting structure normally necessitates forming a multiplicity of bosses, recesses, and grooves on the bottom wall of the piece of luggage in question, so that packing such a piece of luggage becomes rather difficult. If the wheel structure is not recessed in the bottom wall of the luggage it projects therefrom and makes handling of the luggage rather difficult.

OBJECTS OF THE INVENTION

It is therefore an object of the present invention to provide an improved wheel-mounted piece of luggage.

Another object is to provide such a piece of luggage which is substantially similar to the prior-art types while avoiding the disadvantages thereof.

SUMMARY OF THE INVENTION

These objects are attained according to the instant invention in a piece of luggage wherein the case has a substantially flat bottom wall that is formed with pair of generally parallel, relatively narrow, and outwardly open elongated grooves having upper and lower groove ends. A pair of longitudinally spaced, relatively wide, and outwardly open recesses are formed in the bottom wall at each groove between the ends thereof, and a wheel cutout is also formed in this bottom wall adjacent each lower groove end. Respective solid support blocks are force-fitted in these recesses and are each formed with a throughgoing passage aligned with the respective groove. Respective tubes extend longitudinally along the grooves through the respective passages. These tubes are rotatable in the respective grooves and passages and have upper tube ends at the upper groove ends and lower tube ends at the lower groove ends. Respective pivot mounts are carried on the lower tube ends and respective wheels are journaled on these pivot mounts. A handle is connected to the upper tube ends and is displaceable longitudinally relative thereto. Means is provided in the tubes between the handle and the pivot mounts for pivoting the mounts through about 90° between positions with the wheels recessed in the cutouts and with the wheels standing up from the bottom wall on displacement of the handle longitudinally away from the upper tube ends.

Thus the system according to the instant invention is relatively compact and quite simple, eliminating the standard cross brace that is normally provided adjacent the lower ends of the tube. It therefore adds minimal weight to the suitcase it is provided on. Furthermore according to this invention the bottom wall of the case has generally planar noninterrupted faces except at the grooves, recesses, and cutouts, so the system according to the instant invention does not rob valuable interior space in the case.

According to further features of this invention these support blocks have outer surfaces that are coplanar with the outer face of the bottom wall of the case. Furthermore both the recesses and the blocks are complementary and, seen in axial cross section relative to axes perpendicular to the bottom wall, are of T-section. Such construction ensures an extremely good connection of the wheel structure to the case, which connection is aided according to this invention by providing means such as an adhesive or screws for securing the support blocks permanently and fixedly in their respective recesses.

The system according to the instant invention therefore has all of the advantages of standard wheel-mounted luggage, while still providing good interior space and, as a result of the extremely simple structure of the arrangement, being relatively inexpensive to manufacture. Furthermore the simplicity of this system makes it relatively light.

SPECIFIC DESCRIPTION

Figure 1:
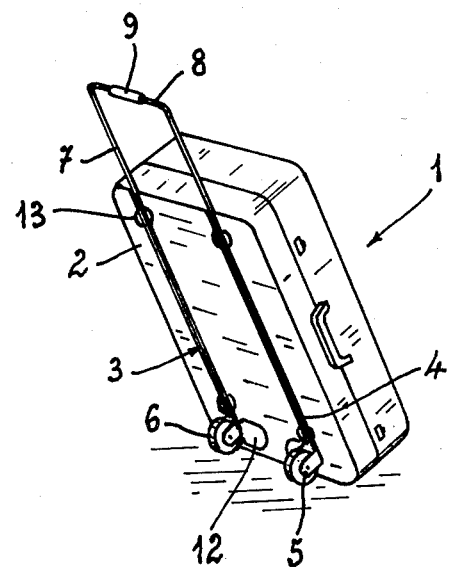
FIG. 1 is a perspective view of a piece of luggage according to this invention with the rollers erected in the rolling position.
Figure 2:
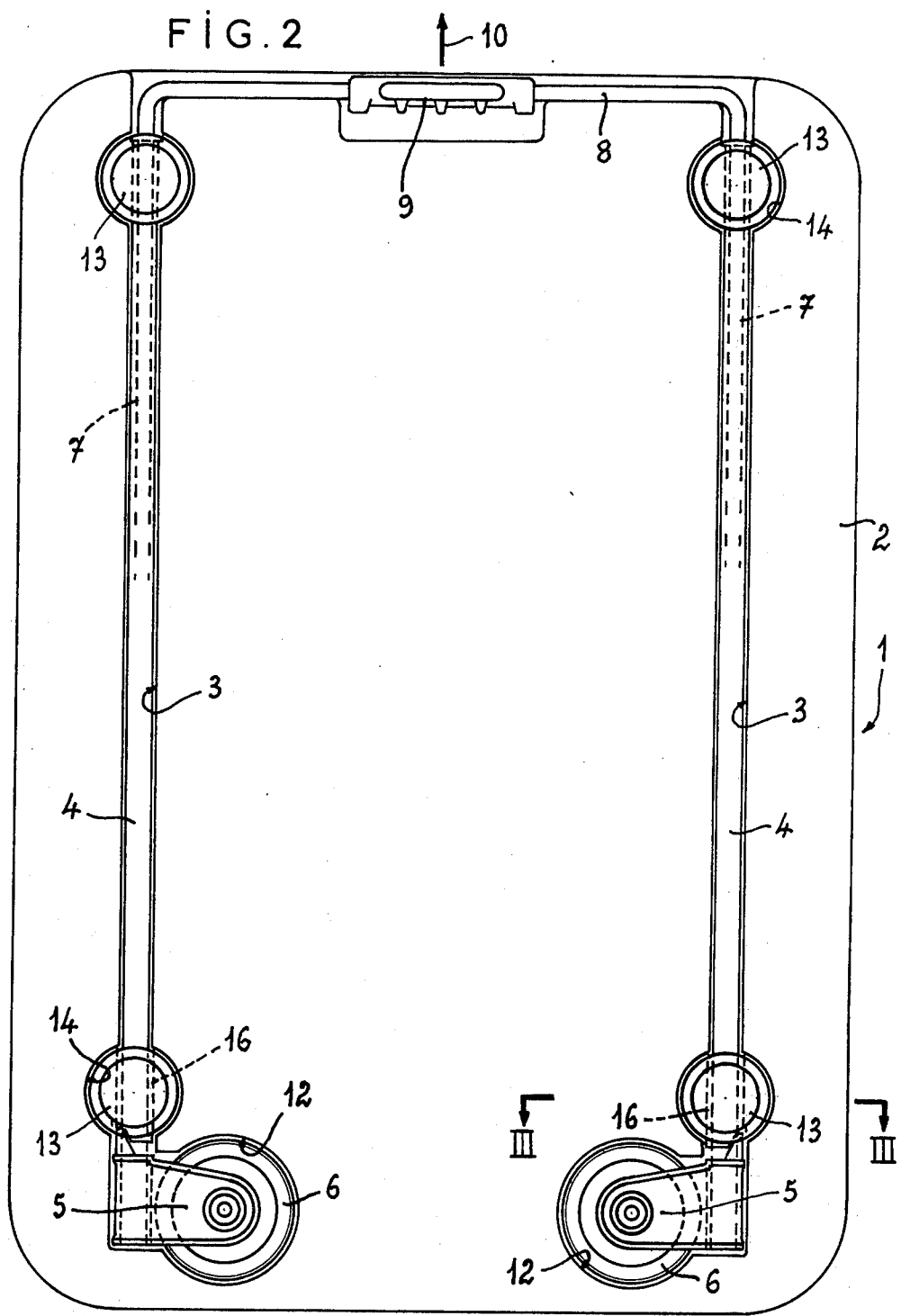
FIG. 2 is a large-scale bottom view of this invention showing the wheel structure in the transport or hand-carried position.

A seen in FIGS. 1 and 2 a suitcase 1 has a bottom-wall panel 2 formed with a pair of parallel longitudinally extending grooves 3 in each of which is received a respective tube 4 carrying at its lower end a wheel pivot yoke 5 for a respective wheel 6. Each of these tubes is provided internally with a rod 7, and a handle 8 is unitarily formed with these rods and itself carries a grip 9. The entire handle part 7-9 is displaceable in a direction 10 away from the wheels 6. The rods 7 are each formed with a helical screw thread and the upper end of each of the tubes 4 is formed with a nut mating with this screw thread so that as the handle or grip 9 is pulled in the direction 10 the tubes 4 are counter-rotated through 90°. This has the effect, as described in better detail in my U.S. Pat. No. 3,842,953 to which reference should be made for specifics, of lifting each of the wheels 6 out of a respective recess or cutout 12 in the bottom of the wall 2 into a position standing up at right angles to the wall 2, with the rotation axes of the wheels 6 coaxial.

Figure 3:
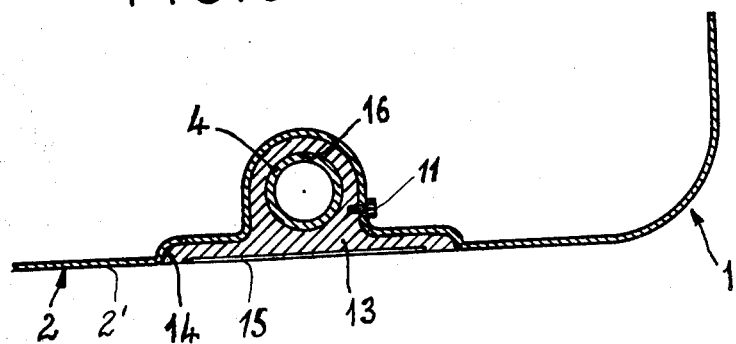
FIG. 3 is a section taken along line III—III of FIG. 2.

According to this invention the bottom wall 2 is formed as also shown in FIG. 3 adjacent each end of each groove 3 with a T-section recess 14 in which is forced-fitted a T-shaped support block 13 formed with a throughgoing cylindrical passage 16 through which the respective tube 4 extends, with relative rotation between the tubes 4 and the support blocks 13. The outer surfaces 15 of the support blocks 13 are coplanar with the outer face 2' of the panel 2. Means such as an adhesive or small screws 11 are provided for securing each of the blocks 13 in its respective recess or socket 14.

It is therefore possible for the system according to the instant invention to do away with the complicated brackets and cleats normally provided to interconnect the wheel structure and to secure it to the case 1. Instead the four support blocks 13 are merely force-fitted in the respective recesses 14 so that the entire assembly becomes virtually integral. The result is not only a considerable saving in manufacturing cost, but a considerable reduction in weight for the piece of luggage thus equipped and an increase in available interior room for the piece of luggage.

I claim:

1. A piece of luggage comprising:
   a case having a substantially flat bottom wall formed with
   a pair of generally parallel, relatively narrow, and outwardly open elongated grooves having upper and lower groove ends,
   a pair of longitudinally spaced, relatively wide, and outwardly open recesses at each groove between the ends thereof, and
   a wheel cutout adjacent each lower groove end;
   respective solid support blocks force-fitted in said recesses and each formed with a throughgoing passage aligned with the respective groove;
   respective tubes extending longitudinally along said grooves through the respective passages and rotatable therein and having upper tube ends at said upper groove ends and lower tube ends at said lower groove ends;
   respective pivot mounts carried on said lower tube ends;
   respective wheels journaled on said pivot mounts;
   a handle connected to said upper tube ends and displaceable longitudinally relative thereto; and
   means in said tubes between said handle and said pivot mounts for pivoting said mounts through about 90° between positions with said wheels in said cutouts and with said wheels standing up from said bottom wall on displacement of said handle longitudinally away from said upper tube ends.

2. The piece of luggage defined in claim 1 wherein said bottom wall has generally planar and uninterrupted inner and outer faces except at said grooves, recesses, and cutouts.

3. The piece of luggage defined in claim 2 wherein said blocks have outer surfaces coplanar with said outer face.

4. The piece of luggage defined in claim 3 wherein said recesses and blocks are complementary.

5. The piece of luggage defined in claim 4, further comprising means for securing said blocks fixedly in said recesses.

6. The piece of luggage defined in claim 4 wherein said recesses are rotation-symmetrical abut respective center axes perpendicular to said faces.

7. The piece of luggage defined in claim 6 wherein said recesses and blocks are of axial T-section.

* * * * *